United States Patent
Wiedemann et al.

(10) Patent No.: US 7,653,977 B2
(45) Date of Patent: Feb. 2, 2010

(54) SYSTEM AND METHOD FOR MACHINING BODY PARTS, WHEREIN ROBOTS ARE SYNCHRONISED WITH A CONVEYOR BELT

(75) Inventors: Gerhard Wiedemann, Graben (DE); Helmut Grieger, Kissing (DE); Larry Drake, Clarkston, MI (US)

(73) Assignee: KUKA Systems GmbH, Augsburg (DE)

( * ) Notice: Subject to any disclaimer, the term of this patent is extended or adjusted under 35 U.S.C. 154(b) by 905 days.

(21) Appl. No.: 10/532,741

(22) PCT Filed: Oct. 23, 2003

(86) PCT No.: PCT/EP03/11729

§ 371 (c)(1),
(2), (4) Date: Apr. 26, 2005

(87) PCT Pub. No.: WO2004/037496

PCT Pub. Date: May 6, 2004

(65) Prior Publication Data

US 2006/0042914 A1  Mar. 2, 2006

(30) Foreign Application Priority Data

Oct. 28, 2002 (DE) .............................. 202 16 636 U

(51) Int. Cl.
*G01M 19/00* (2006.01)
*B23P 21/00* (2006.01)
*G05B 15/00* (2006.01)

(52) U.S. Cl. ...................... 29/407.04; 29/709; 198/575

(58) Field of Classification Search .............. 29/407.04, 29/429, 428, 430, 706, 709, 711, 712, 720; 700/259, 88; 198/575

See application file for complete search history.

(56) References Cited

U.S. PATENT DOCUMENTS 3,654,616 A * 4/1972 Dunne et al. .................. 700/88

(Continued)

FOREIGN PATENT DOCUMENTS

DE  2 234 759  2/1973

(Continued)

OTHER PUBLICATIONS

Dirndorfer A, 1992, Industrieroboter Zur Foerderbandsynchronen Montage, vol. 8, No. 1.

*Primary Examiner*—John C Hong
(74) *Attorney, Agent, or Firm*—McGlew and Tuttle, P.C.

(57) ABSTRACT

A method and a system are provided for machining, especially for joining work pieces (2) in the shell of a body structure. The work pieces are transported in a continuous manner along a transfer line (3) by a conveyor (5) and are machined by several robots (7, 8) which are preferably arranged in a stationary manner on the transfer line. The robots (7, 8) are synchronized with the conveying movement of the workpieces (2). The movement and the position of the workpieces (2) are detected by a sensor system (13) which informs a control system (12) which controls the conveyors (5) and the robots (7,8). The machining system (1) can comprise a monitoring system (11) provided with an optical image detection system, which enables synchronization to be monitored and possibly retroactively adjusted.

20 Claims, 5 Drawing Sheets

U.S. PATENT DOCUMENTS

| | | |
|---|---|---|
| 4,254,433 A | 3/1981 | Dewar, Jr. et al. |
| 4,589,184 A | 5/1986 | Asano et al. |
| 5,584,326 A * | 12/1996 | Galli .......................... 141/83 |
| 6,509,576 B2 | 1/2003 | Woo-Dong |

FOREIGN PATENT DOCUMENTS

| | | |
|---|---|---|
| DE | 24 30 058 | 1/1976 |
| DE | 33 19 169 A1 | 12/1983 |
| DE | 35 16 284 A1 | 6/1986 |
| DE | 195 20 582 C1 | 8/1996 |
| DE | 101 36 691 A1 | 4/2002 |
| DE | 101 02 758 A1 | 7/2002 |
| DE | 199 31 676 C2 | 7/2002 |
| GB | 2121561 | 12/1983 |
| WO | WO 03/034165 A1 | 4/2003 |

* cited by examiner

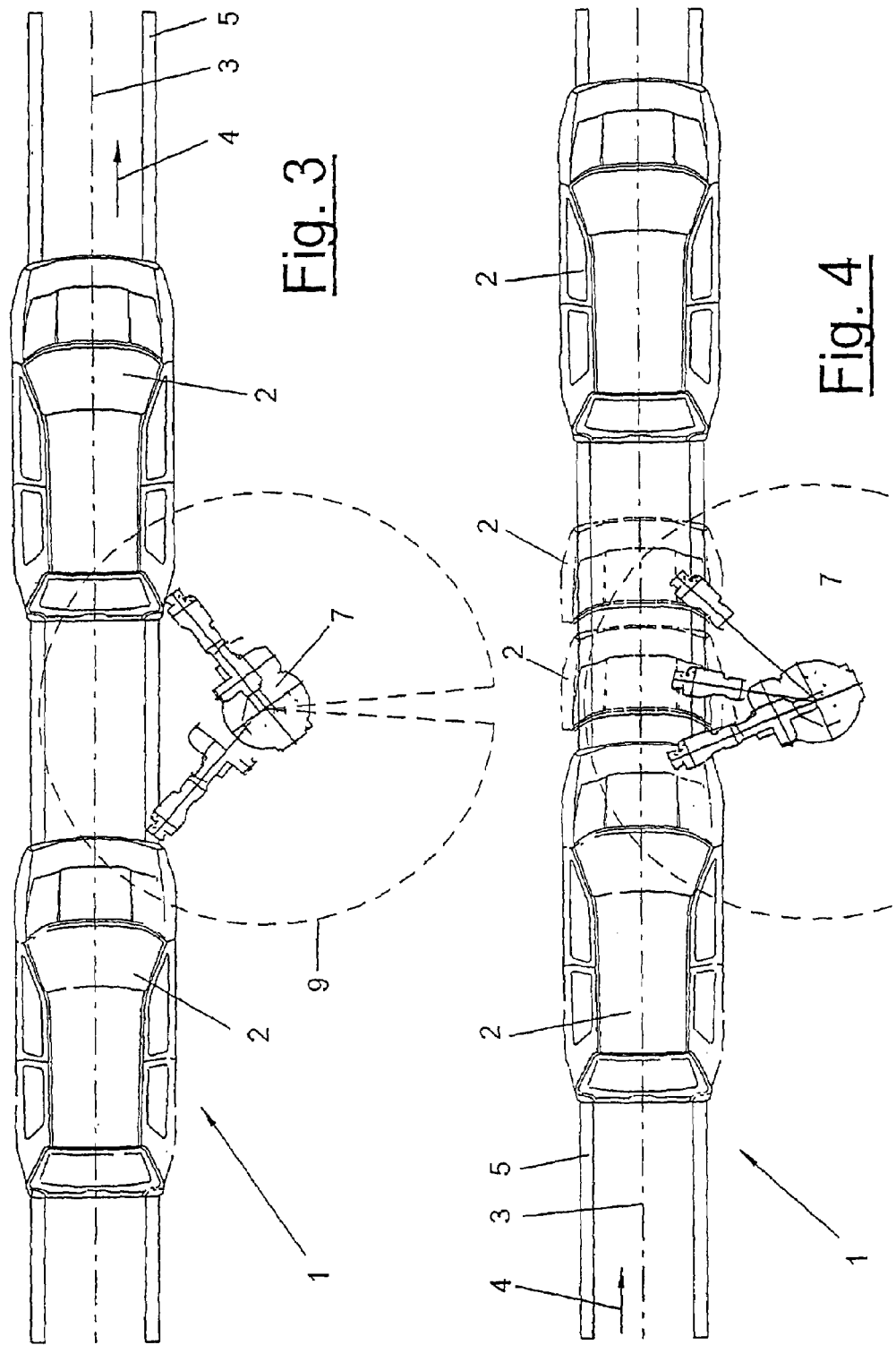

(State of The Art)

SYSTEM AND METHOD FOR MACHINING BODY PARTS, WHEREIN ROBOTS ARE SYNCHRONISED WITH A CONVEYOR BELT

CROSS REFERENCE TO RELATED APPLICATIONS

This application is a United States National Phase application of International Application PCT/EP2003/011729 of Oct. 23, 2003 and claims the benefit of priority under 35 U.S.C. § 119 of German Application DE 202 16 636.8 U1 filed Oct. 28, 2002, the entire contents of which are incorporated herein by reference.

FIELD OF THE INVENTION

The present invention pertains to a machining process for machining, especially joining workpieces in the manufacture of body shells and pertains to a machining plant, especially a joining plant, for the manufacture of the body shells, comprising a conveyor for the workpieces and a plurality of multiaxial robots arranged stationarily along the transfer line.

BACKGROUND OF THE INVENTION

Such joining plants for manufacturing body shells are known from practice. They comprise a cyclically operating conveyor for the workpieces, which is designed, e.g., as a lifting shuttle. The joining plant is divided here into a plurality of stations, which are arranged along the conveyor or transfer line and in which different joining tasks are performed by robots on the stationary workpiece, the robots being arranged stationarily in the stations on one or more sides of the transfer line. This design has the drawback that a relatively large number of robots is necessary, and the robots as well as the tools are not utilized optimally. Due to the binding to stations and working on the stationary workpiece, there is a fixed binding to the cycle time, and, in addition, the robots have a limited working range only. The overall cycle of the joining plant also includes, besides the working time, the conveying time as an appreciable component, which adversely affects the efficiency. Furthermore, there is an increased distance between the robots at the transitions from one station to another due to the binding to stations, which increases the space requirement. Since the robots machine only partial areas on the stationary workpiece, a plurality of robots and also a plurality of tools of the same type must be used for tasks of the same kind on the front and rear sides of the workpiece.

Assembly on moving bodies is known from DE 195 20 582 C1. The assembly robot is moving in this case along an additional travel axis in the conveying direction, synchronously with the body, and is coupled with the body conveyor for this purpose. After the end of the assembly job, the robot must be returned into its starting position. This leads to increased space requirement in the conveying direction. Moreover, it is not possible to line up a plurality of robots at closely spaced locations next to one another in the conveying direction.

DE 35 16 284 A1 likewise pertains to the performance of assembly operations on a moving vehicle body. Assembly robots with an additional linear axis, which move synchronously together with the vehicle being conveyed and must be returned after the completion of the job, are present here as well.

DE 199 31 676 C2 teaches the measurement of a body, which is stationarily resting during the measuring operation. The measuring robot has an additional linear axis, with which it can change its basic working position. It must be zeroed again at the new measurement site on the basis of stationary calibration marks.

DE 101 36 691 A1 pertains to the compensation of position errors of a robot by means of a laser measuring instrument. This is only a calibration operation. In addition, a welding tool and a workpiece can also be measured and calibrated with the measuring instrument, which simplifies and expedites the calibration operation.

DE 24 30 058 A1 discloses a position measuring system for robot members and is used to measure and calibrate a robot with compensation of its axis error.

SUMMARY OF THE INVENTION

The object of the present invention is to provide a better machining process along with a machining plant and especially a joining plant for manufacturing body shells.

According to the invention, a process for machining, especially joining workpieces in the manufacture of body shells is provided in which the workpieces are conveyed by a conveyor along a transfer line and are machined by a plurality of stationarily arranged, multiaxial robots. The workpieces are conveyed continuously and machined by the robots during the forward movement, wherein the movements of the robots along the axes are synchronized with the conveying movement. The movement and the position of the workpieces are detected with a sensor system and reported to a control system, which controls the conveyors and the robots.

According to another aspect of the invention, a machining plant such as a joining plant, for the manufacture of body shells (motor vehicle body shells) has a conveyor for the workpieces and a plurality of multiaxial robots arranged stationarily along the transfer line. The conveyor is designed as a continuously operating conveyor and the movements of the robots along their axes are synchronizable with the conveying movement for machining the moving workpieces. The machining plant has a sensor system for detecting the movement and the position of the workpieces and a control system to which the conveyors, the sensor system and the robots are connected.

Higher efficiency and better utilization of the robots used and their tools can be achieved with the claimed process and the joining plant, which is designed, e.g., in the preferred embodiment, as a so-called respot welding plant. The binding to stations can also be eliminated. The space requirement and the design effort are reduced. The number of robots used can be minimized because of the fact that their working range is enlarged in terms of function and in space.

The rigid binding to a cycle time can be eliminated by the continuous conveyors and the machining of the workpieces during the movement of the conveyor. The output of the joining plant is increased. The robots can be optimally positioned corresponding to their function and their machining tasks. Unnecessary free spaces, as they were present in case of the prior binding to stations, can be avoided. The space requirement of the joining plant decreases correspondingly.

A suitable sensor system for detecting the movements and the positions of the workpieces, which cooperates with a control system, which is, for example, a higher-level control system or a control system integrated in a robot control, is present for the synchronization of the preferably stationarily arranged robots with the conveying movement of the workpieces. As a result, the conveyor and the robots can be controlled and synchronized centrally. A monitoring system, which monitors compliance with the synchronization in the working range of the robots and optionally ensures the adjustment of the conveying movement and/or the movement of robots, is preferably present as well.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a functional view of a detail of the joining plant according to FIG. 2 with synchronized robots;

FIG. 4 is another functional view of a detail of the joining plant according to FIG. 2 with synchronized robots;

DESCRIPTION OF THE PREFERRED EMBODIMENTS

Figure 6:
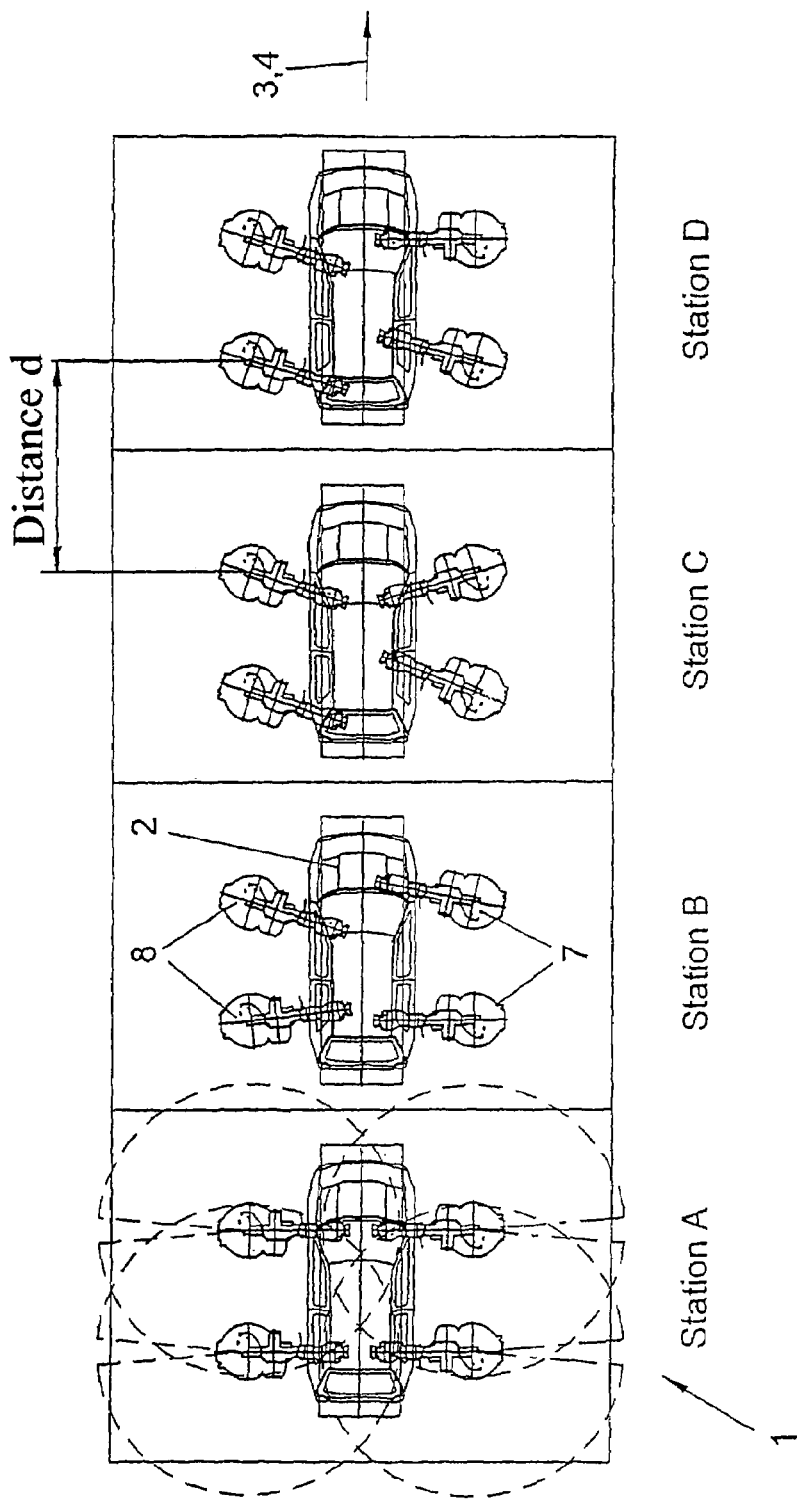
FIG. 6 is a joining plant according to the state of the art.

Referring to the drawings in particular, FIG. 6 shows a machining plant 1 for manufacturing body shells in a design according to the state of the art known from practice. The machining plant 1 is designed as a joining plant for manufacturing body shells, especially as a respot welding plant for vehicle body shells or body shell components. It is divided into a plurality of stations A through D arranged one after another along a transfer line 3. The vehicle body shells 2 are conveyed from one station to the next by means of a conveyor 5 overlying the plant. This is a cyclically operating conveyor, e.g., a lifting shuttle. A working cycle that is preset in a fixed manner and is divided into machining times and conveying times, applies to the entire joining plant 1. One or more stationary robots 7, 8, which join the bodies 2, which are stationary during the machining, e.g., weld them by means of spot welding tongs or other welding tools, is/are arranged within the stations A through D on one side or on both sides of the transfer line 3. The robots 7, 8 have working ranges limited in space at the body 2, one robot 7,8 working in the front area of the body on each side and another robot 7, 8 working in the rear area of the body. The tools, especially welding tools, must be correspondingly present as a plurality of tools for activities of the same kind, e.g., spot welding.

A free space is usually left between the individual stations A through D, the adjacent robots 7, 8 having a greater distance d in this area than within the individual stations A through D. The prior-art joining plant 1 with the station concept therefore requires a considerable amount of space in the transfer direction and its efficiency is not optimal due to the strict working cycle.

FIGS. 1 through 5 show a machining plant 1 according to the present invention, especially in the form of a joining plant and especially a respot welding plant. One or more conveyors 5, which are designed as continuously operating conveyors and convey the workpieces 2, especially vehicle body shells or body parts, in a continuous and preferably steady movement in the conveying direction 4, are used in the joining plant 1.

The conveying movement may be adjusted to a constant velocity. As an alternative, the conveying velocity may vary locally and be accelerated or decelerated at individual conveyors 5 in case of the use of a plurality of conveyors 5. As a result, the distances between the workpieces 2 may change locally (so-called "breathing" of the workpieces). An increase in the distance creates, e.g., space in the front and rear areas for machining operations to be performed there. The original distance is then restored by a subsequent deceleration.

The workpieces 2 may be arranged directly on the conveyor 5. As an alternative, they may also be held on carriers, especially pallets 6, in a predetermined position and clamped and conveyed with these carriers 6.

The individual conveyor 5 may be a one-part conveyor. As an alternative, it may also be divided into a plurality of conveying sections. The conveyor or the conveying sections have suitable controllable drives each, which are schematically shown as motors in FIG. 1. The conveyor 5 may have any desired suitable design as a roller type conveyor, chain conveyor or the like.

The robots 7, 8 machine the workpieces 2 being conveyed during their conveying movement. The robot movements can be synchronized with the conveying movement for this purpose. The robots 7, 8 are controlled now as a function of the position and the velocity of conveying of the workpieces 2. The joining plant 1 has a suitable sensor system 13 for this purpose for detecting the movements and the positions of the workpieces 2 and/or their carriers 6.

The robots 7, 8 are designed as stationary articulated arm robots, which remain stationary with their base at the bottom during the activity. The robots 7, 8 have a plurality of rotatory axes, preferably six axes. They are designed, e.g., as industrial roots, in which a carrousel rotates around the first vertical axis I on the stationary base, and a rocker is mounted pivotably around a horizontal second axis II at the carousel, and an extension arm at the end of the rocker is mounted pivotably around a horizontal third axis III. The extension arm carries at its end a multiaxial robot hand, preferably a so-called central hand with three intersecting rotatory axes IV, V and VI. The above-mentioned synchronization with the conveying movement is brought about by changes in the rotary movements of the rotatory axes, which are usually multiaxially superimposed to one another.

In addition, a monitoring means 11 is present in order to monitor compliance with the synchronization during the process. The monitoring system 11 may have, e.g., one or more means, especially cameras, for optical imaging and evaluation for this purpose. It can be determined from this, e.g., whether the robots 7, 8 with their tools 10, synchronized with the conveying movement, are indeed being moved synchronously with the workpiece 2 during the joining operation and/or during their feed and resetting motions. In addition, any imminent collisions between tools 10 and interfering edges on the workpiece 2 can be detected. The collision-free mutual coordination of adjacent robots 7, 8 can be monitored as well.

Compliance with the synchronization can also be monitored during the joining process in another way, e.g., by force measurement at the robot 7, 8 and/or at the tool 10. If the movement of the robot is not synchronous with the conveying movement, a relative movement develops, which is manifested in a change in the forces acting in the process, which affect, in turn, the robot axes and can be detected there by monitoring the torques or the power of the axle drives or in another manner, e.g., by means of force and torque sensors.

The robots 7, 8 have a specific machining program stored preferably in their robot control for their operations to be performed at the workpiece 2. This may be, e.g., a machining program programmed for static operation at the stationary workpiece 2, to which a dynamic component corresponding to the conveying movement is superimposed during the execution. It is possible to respond to possible changes in the velocity of conveying or even in the position of the workpieces 2 immediately and on-line in this superimposition. As an alternative, the machining program may already contain the dynamic component and be programmed for a certain conveying movement. Whether the preset dynamic conditions are met or whether an on-line adjustment is necessary is monitored during the synchronization in this case.

The joining plant 1 has at least one control system 12, which is preferably central and overlies plants. All the robots 7, 8 present in the plant 1 are preferably connected to the control system 12. The sensor system 13, the monitoring system and the drives of the conveyor 5 or of the conveying sections are preferably also connected to the central control system 12. To comply with the synchronization, it is possible to use the conveying movement and especially the position and the velocity of the workpieces 2 as a preset value, the working and feed motions of the robots 7, 8 being correspondingly synchronized. The conveyor 5 may also be adjusted to a preset value, especially if the robots 7, 8 already store dynamized machining programs in their control.

A station 14 in which the conveyor 5 or the carrier 6 is loaded with workpieces 2 may be arranged upstream of the joining plant 1 on the input side. Furthermore, clamping functions may be performed in this station 14 by actuating, e.g., tension jacks on the carrier 6 by connecting corresponding energy and control connections. These energy and control connections can again be disconnected during the conveying through the plant 1. The station 14 is preferably also connected for this purpose with the central control system 12 via a corresponding control component. Finally, checking operations may also be performed in the station 14 in order to check the workpiece 2 for correct positioning on the conveyor 5 or on the carrier 6 as well as the tension jacks and possibly other machine components for correct function.

A similar station 15, on which the machined workpieces 2 are unloaded from the conveyor 5 or the carriers 6, may be present on the output side of the joining plant 1. Checking operations may also be carried out here once again to finally check compliance with the correct clamped position of the workpieces 2 during the preceding passage through the plant and optionally also to carry out a quality control of the joining operations carried out in the plant 1.

Figure 2:
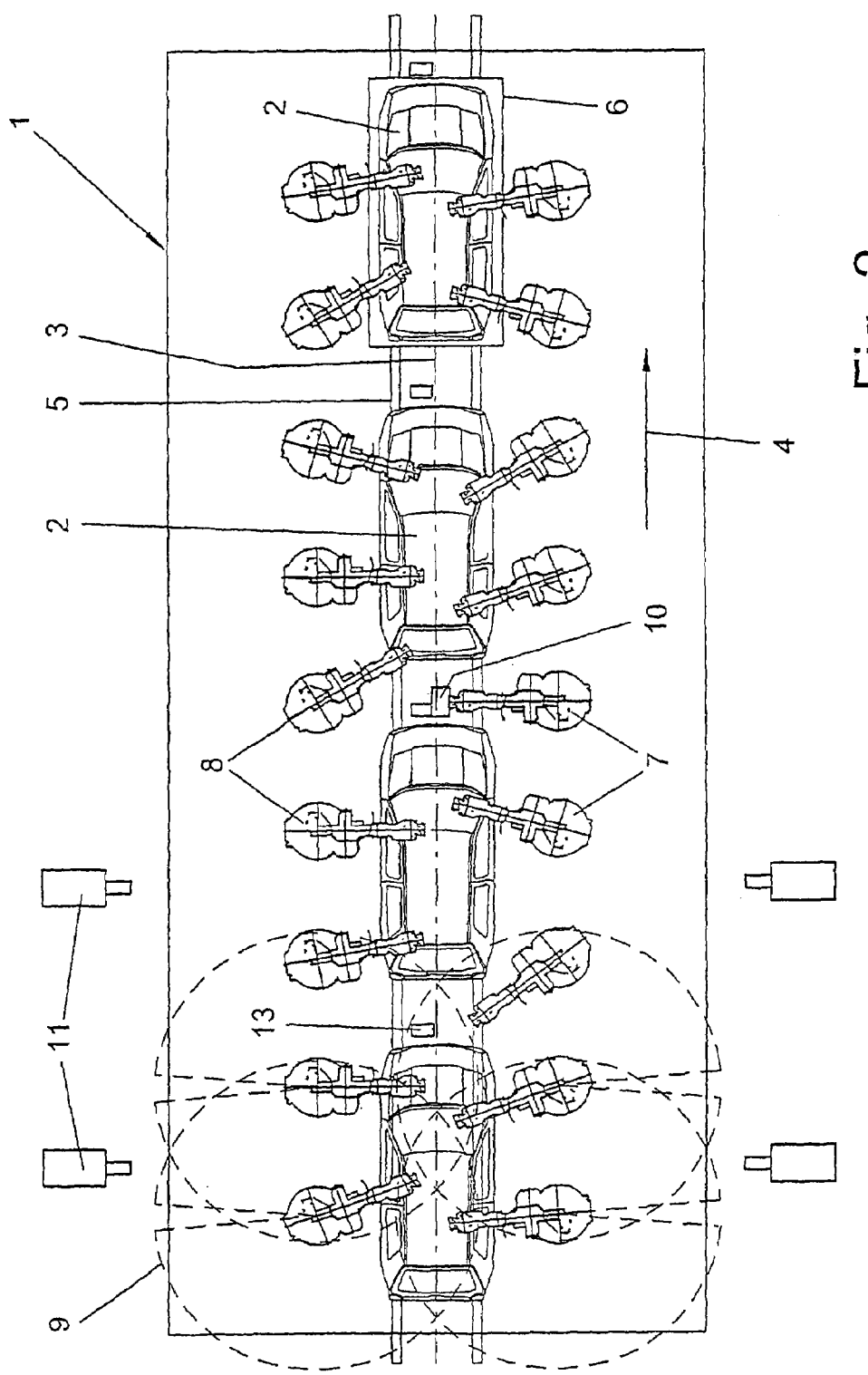
FIG. 2 is an enlarged top view of the joining plant according to FIG. 1.
Figure 5:
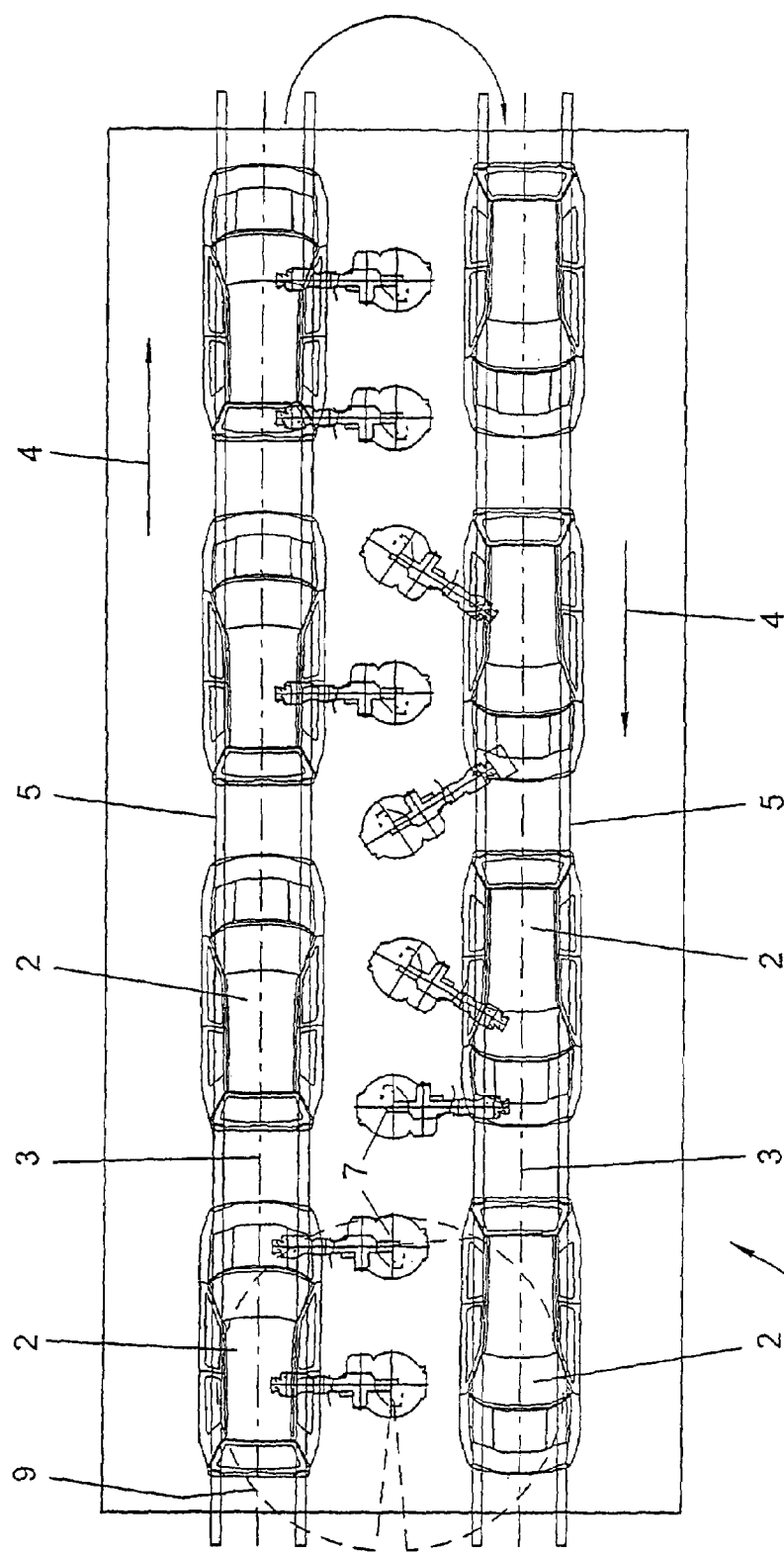
FIG. 5 is a top view showing a variant of the joining plant according to FIG. 2.

FIG. 5 schematically shows a variant of the joining plant 1 according to FIG. 2. In FIG. 2, the robots 7, 8 are arranged on both sides of the transfer line 3, and the workpieces 2 pass through the plant 1 only once and in one direction. In the variant according to FIG. 5, the workpieces 2 are moved in a loop or a circle through a correspondingly designed conveyor 5. Robots 7 are arranged in this case only on one side of the transfer line 3, and these robots are, moreover, located, between the two transfer lines 3 formed by the loop or the circle. The robots 7 now machine the right-hand side of the vehicle parts 2 during their forward motion and their left-hand side during their return motion. The robots 7 may work alternatingly towards and backwards.

FIGS. 3 and 4 show a schematic view of the synchronized robot operations. As is illustrated in FIG. 3, the robot 7 at first machines the rear area of the workpiece 2 located in the front in the conveying direction 4 with its tool, not shown, by welding, e.g., a plurality of weld spots therewith spot welding tongs. As soon as the operation is completed or the workpiece 2 leaves the working area 9 of the robot 7, the robot 7 pivots back into the position indicated by broken line and machines the next workpiece 2 following at a distance, performing machining operations on the front side of the workpiece. The robot 7 can consequently machine different areas of the workpiece 2 being moved past it with correspondingly different processes.

The machining operations take place in any desired movement along a path in space, the robot hand and the tool being moved multiaxially. The synchronization of the movements of the robots 7, 8 along the axes is likewise multiaxial. Contrary to pure assembly operations, e.g., the lateral mounting of wheels on the vehicle, in which the robot must move the independently movable tool, e.g., a mechanical screwdriver, with only simple kinematics on a straight path synchronously along the conveying direction and the tool performs the transversely directed mounting operations itself with a drive of its own and without the need for robot axes, a substantially more complicated kinematics is required in the case of these complex machining operations and the optimized interaction of a plurality of robots 7, 8 standing next to each other. The robot movements and their synchronization depend on the needs of the process and the component.

A machining path extending at right angles or obliquely in relation to the conveying direction and possibly also with a vertical component, e.g., a weld seam or bonded seam, weld spot line, etc., requires a changed synchronization of the movements along the axes during the following of the path with a robot-guided welding tool each time there is a change in direction. This goes beyond a pure straight guiding along the conveying direction because the path followed by the robot 7, 8 and its tool extends in space and with readily varying directions and curvatures.

The robot 7 may also change the tool, if necessary, during the machining. The robot is optimally utilized as a result, and the tools 10 used are also better utilized and their number is optimized. Joining operations of the same kind can thus be carried out by one robot 7 on the entire side of the workpiece 2 that moves past it and faces it. The robot 7 may place, e.g., all or at least a majority of the weld spots on the right-hand side of the vehicle body 2 in FIG. 3.

Figure 1:
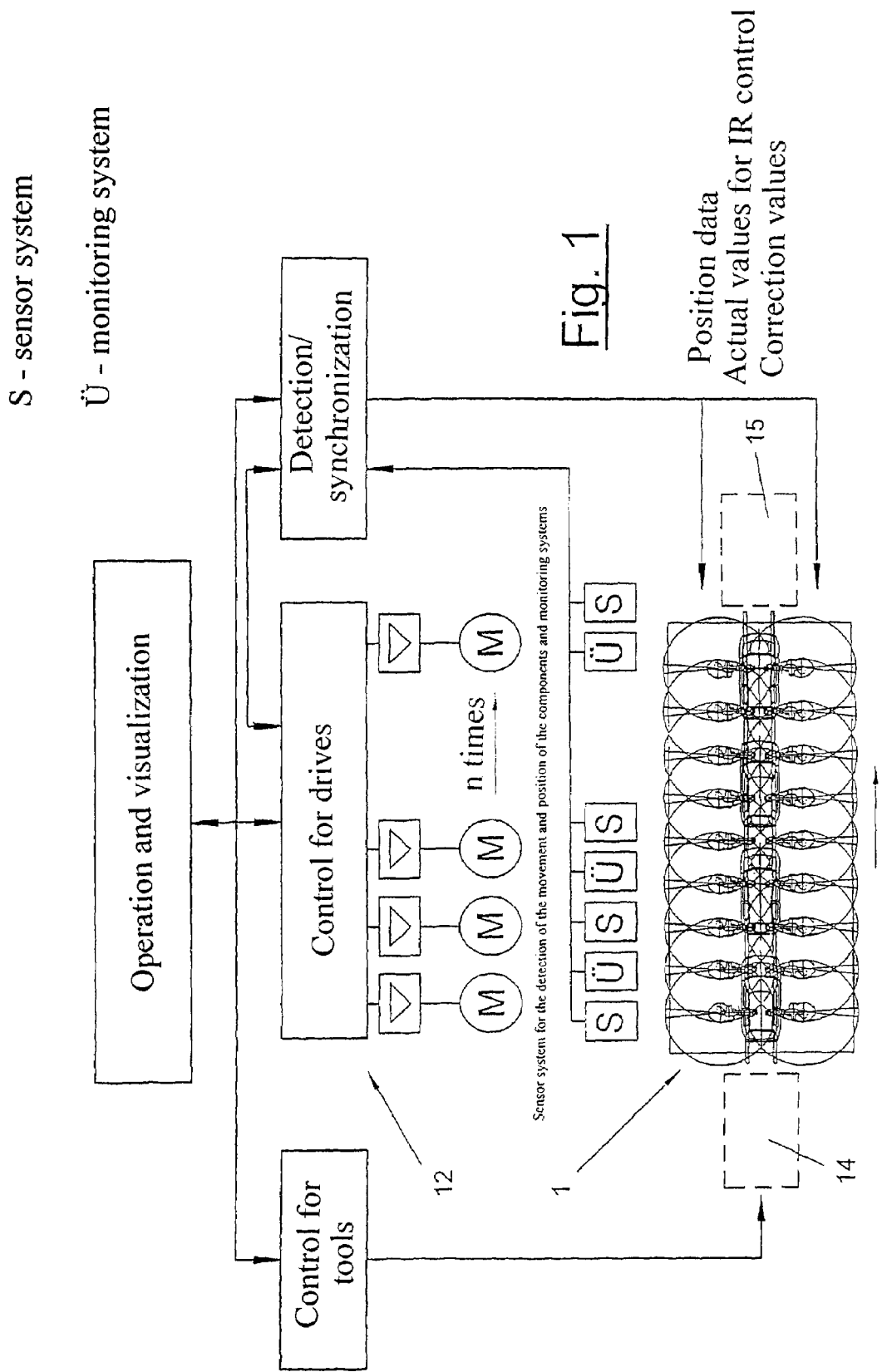
FIG. 1 is a schematic view of a machining plant with a central control system.

As is illustrated in FIGS. 1 and 2, the robots 7, 8 are arranged essentially at equal distance from one another along the transfer line 3. The working ranges of the robots 7 at the workpieces 2 can be enlarged now compared with prior-art plants, so that fewer robots 7, 8 are needed, The distance between the robots 7, 8 along the transfer line 3 can be optimized and set according to the needs of the process. There are no longer any rigid dimensions and binding to specific distances, as in the case of the state of the art according to FIG. 6. In addition, the binding to stations is preferably eliminated in the joining plant 1 according to the present invention, so that the safety and free spaces present before between the stations are dispensable. The robots 7, 8 can be arranged at correspondingly more closely spaced locations from one another. The length of the plant becomes correspondingly shorter.

FIG. 4 illustrates in another view the synchronized movement of the robots 7, 8 with the workpiece conveying. The robot 7 welds at first areas on the body shell, e.g., with the workpiece 2 arriving from the left. The robot 7 also rotates around its vertical base axis I during the continuous conveying of the workpiece and possibly also changes the other axis positions, in order to thus place, e.g., a series of weld spots on the body shell. The robot 7 also moves now by corresponding movements along axes synchronously with the body part 2 during the welding operation with the welding tongs closed. The feed motion to the next weld spot likewise takes place synchronously. FIG. 4 shows the feed of the body part and the corresponding synchronous adjusting movements of the robot 7 by broken lines and cut-away views. The workpiece 10 is not shown for clarity's sake. The position of the robot 7 is also shown as a cut-away view and partially.

In the preferred embodiment, the robots 7, 8 are arranged stationarily at the bottom and on one side or on both sides of the transfer line 3 and the conveyor 5. In addition, robots may be arranged at a frame or portal located within the plant 1. In another variant, the robots may have one or more additional axes, e.g., a travel axis directed along the transfer line 3.

Various variants of the embodiments shown are possible. This applies, on the one hand, to the number, arrangement and design of the robots 7, 8. The designs of the conveyor 5 and the sensor system 13 used as well as the monitoring means 11 may also be varied.

The synchronization between the conveying movement and the robot movement may also take place mechanically as an alternative, e.g., by a temporary, optionally articulated towing connection or another mechanical coupling of a suitable robot part, e.g., the front end of the extension arm, with a workpiece 2, a carrier 6 or a moving part of a conveyor 5.

Furthermore, the control system 12, which may also comprise a plurality of individual control components, is variable. In addition, it is possible here to shift the control system 12 entirely or partially into one or more robot controls, in which case the conveyor 5 or conveyors is/are controlled in its/their working range by an individual robot 7, 8 or a group of robots 7, 8. As a result, the conveying movement can be locally optimally coordinated with the needs of the process or the properties of the robot. Furthermore, it is possible to shift the central plant control into a robot control.

While specific embodiments of the invention have been shown and described in detail to illustrate the application of the principles of the invention, it will be understood that the invention may be embodied otherwise without departing from such principles.

The invention claimed is:

1. A process for machining and/or joining workpieces in the manufacture of body shells, the process comprising the steps of:
    conveying the workpieces using a conveyor along a transfer line;
    machining and/or performing joining operations on the workpieces using a plurality of stationarily arranged, multiaxial robots wherein the workpieces are conveyed continuously and machining and/or joining operations are carried our by the robots during the forward movement of the workpieces;
    synchronizing the movements of the robots along the axes with the conveying movement; and
    detecting the movement and the position of the workpieces with a sensor system with the detection being reported to a control system;
    controlling the conveyors and the robots with the control system.

2. A machining plant and/or joining plant, for the manufacture of body shells, the plant comprising:
    a conveyor for the workpieces;
    a plurality of multiaxial robots arranged stationarily along the transfer line, wherein the conveyor is designed as a continuously operating conveyor and the movements of the robots along axes of the robots can be synchronized with the conveying movement for machining the moving workpieces;
    a sensor system for detecting the movement and the position of the workpieces; and
    a control system, to which the conveyors, the sensor system and the robots are connected, said control system controlling the robots relative to the continuously operating conveyor so workpieces are conveyed continuously such that machining operations and/or joining operations are performed by the robot during the forward movement of the workpieces on the continuously operating conveyor section with the control system synchronizing the movements of the robots along the axes with the conveying movement of the workpieces.

3. A machining plant in accordance with claim 2, wherein the machining plant has a monitoring system for the synchronization of the movements of the robot.

4. A machining plant in accordance with claim 3, wherein the monitoring system has one or more means for optical imaging and evaluation.

5. A machining plant in accordance with claim 2, wherein the monitoring system is connected to the control system.

6. A machining plant in accordance with claim 2, wherein the robot controls have dynamized machining programs that can be synchronized on-line with the movement of the conveyor.

7. A machining plant in accordance with claim 2, wherein the robots are designed as multiaxial articulated arm robots, preferably as six-axis industrial robots.

8. A machining plant in accordance with claim 2, wherein the robots are arranged stationarily and on one side or on both sides of the transfer line.

9. A machining plant in accordance with claim 2, wherein the robots are arranged at equally spaced locations.

10. A machining plant in accordance with claim 2, wherein the conveyor has a plurality of said conveying sections with independent drives connected to the control system.

11. A machining plant in accordance with claim 2, wherein the tools are arranged and clamped on carriers.

12. A machining plant in accordance with claim 2, wherein the robots carry welding tools.

13. A machining plant in accordance with claim 2, further comprising an input with a loading, clamping and checking station.

14. A machining plant in accordance with claim 2, further comprising an output with a checking and unloading station.

15. A joining plant, for the manufacture of vehicle body shells, the plant comprising:
    a plurality of multiaxial industrial robots for machining and/or joining operations;
    a conveyor means for conveying the workpieces along a transfer line along which said robots are positioned with each of said robots being a stationary position and having a working area, the conveyor means having a continuously operating conveying section;
    a sensor system for detecting the movement and the position of the workpieces; and
    a control system controlling the continuously operating conveyor so workpieces are conveyed continuously and controlling movements of said robots such that machining operations and/or joining operations are performed by the robots during the forward movement of the workpieces on the continuously operating conveyor section with the control system synchronizing the movements of the robots along the axes with the conveying movement of the workpieces, said control system being connected to the conveyor means, to said sensor system and to said robots.

16. A machining plant in accordance with claim 15, further comprising a monitoring system for the synchronization of the movements of said robot, said monitoring system being connected to said control system.

17. A machining plant in accordance with claim 16, wherein the monitoring system has one or more optical imaging and evaluation means for optically imaging and evaluating the operation of said robots and said conveyor means.

18. A machining plant in accordance with claim 17, wherein said control system includes a robot control with dynamized machining programs that can be synchronized on-line with the movement of the conveyor, each of said robots being associated with said robot control.

19. A machining plant in accordance with claim 18, wherein said robots are six-axis industrial robots arranged stationarily and on one side or on both sides of the transfer line arranged at equally spaced locations.

20. A machining plant in accordance with claim 19, wherein said conveyor means includes a plurality of said conveying sections with independent drives connected to the control system wherein tools are arranged and clamped on pallet carriers with said robots carrying welding tools.

* * * * *